(12) United States Patent
Wakasa (10) Patent No.: US 11,232,334 B2
(45) Date of Patent: Jan. 25, 2022

(54) PRINTING DEVICE AND CONTROL METHOD FOR PRINTING DEVICE

(71) Applicant: SEIKO EPSON CORPORATION, Tokyo (JP)

(72) Inventor: Shunichi Wakasa, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/142,476

(22) Filed: Jan. 6, 2021

(65) Prior Publication Data

US 2021/0216833 A1 Jul. 15, 2021

(30) Foreign Application Priority Data

Jan. 9, 2020 (JP) .............................. JP2020-002328

(51) Int. Cl.
*G06K 15/02* (2006.01)
*G06K 15/12* (2006.01)
*G06F 40/109* (2020.01)

(52) U.S. Cl.
CPC ....... *G06K 15/1802* (2013.01); *G06F 40/109* (2020.01); *G06K 15/128* (2013.01); *G06K 15/1817* (2013.01)

(58) Field of Classification Search
CPC .................................................. G06K 15/1802
USPC .......................................................... 358/1.11
See application file for complete search history.

(56) References Cited

U.S. PATENT DOCUMENTS

2018/0232610 A1* 8/2018 Kondo ............... G06K 15/1805

FOREIGN PATENT DOCUMENTS

JP H07-105194 A 4/1995

* cited by examiner

*Primary Examiner* — Jacky X Zheng
(74) *Attorney, Agent, or Firm* — Workman Nydegger (57) ABSTRACT

A printing device includes a printing unit, a buffer, and a control unit. The control unit reads out data from the buffer as target data. When the read-out target data is a character code, the control unit determines whether the target data is a character code associated with a plurality of character forms or not. When the target data is the character code associated with the plurality of character forms, the control unit prefetches data stored in the buffer after the target data, as prefetched data, before printing the target data, and determines whether the prefetched data is a predetermined code or not. When the prefetched data is the predetermined code, the control unit selects a character form indicated by the predetermined code as a target character form and causes the printing unit to print a character represented by the target data, in the selected target character form.

5 Claims, 4 Drawing Sheets

| CODE POINT | CHARACTER FORM OF VARIANT CHARACTER | CHARACTER FORM OF BASE CHARACTER |
|---|---|---|
| U+9022 | 逢 (K2) | 逢 (K1) |

PRINTING DEVICE AND CONTROL METHOD FOR PRINTING DEVICE

The present application is based on, and claims priority from JP Application Serial Number 2020-002328, filed Jan. 9, 2020, the disclosure of which is hereby incorporated by reference herein in its entirety.

BACKGROUND

1. Technical Field

The present disclosure relates to a printing device and a control method for a printing device.

2. Related Art

Research and development have been conducted on a printing device that can print a multiple-character-form character. The multiple-character-form character is a character having a plurality of character forms, for example, a Chinese character.

In connection with this, to convert a kana character into a Chinese character having a plurality of character forms, a method of displaying the plurality of character forms of the Chinese character, thus allowing a user to select a desired character form from among the plurality of character forms, and displaying the Chinese character in the character form selected by the user, is known, for example, as disclosed in JP-A-07-105194.

Meanwhile, a printing device that uses, for printing, an encoding scheme where a character code represents a multiple-character-form character, is known. In such an encoding scheme, a character code cannot distinguish each of the plurality of character forms of a multiple-character-form character. Therefore, with such a printing device, the user cannot easily print a multiple-character-form character in a desired character form.

SUMMARY

In order to solve the foregoing problem, an aspect of the present disclosure is directed to a printing device including: a printing unit performing printing; a buffer temporarily storing accepted data; and a control unit causing the printing unit to print, based on data stored in the buffer. The control unit reads out data from the buffer as target data and determines which of a command and a character code the read-out target data is. When the target data is determined as being the character code, the control unit determines whether the target data is the character code associated with a plurality of character forms or not. When the target data is determined as being the character code associated with the plurality of character forms, the control unit prefetches data stored in the buffer after the target data, as prefetched data, before printing the target data, and determines whether the prefetched data prefetched from the buffer is a predetermined code indicating one of the plurality of character forms or not. When the prefetched data is determined as being the predetermined code, the control unit selects a character form indicated by the predetermined code from among the plurality of character forms associated with the target data, as a target character form, and causes the printing unit to print a character represented by the target data, in the selected target character form.

Also, in order to solve the foregoing problem, another aspect of the present disclosure is directed to a control method for a printing device including: causing a printing unit performing printing to print, based on data stored in a buffer temporarily storing accepted data; reading out data from the buffer as target data and determining which of a command and a character code the read-out target data is; when the target data is determined as being the character code, determining whether the target data is the character code associated with a plurality of character forms or not; when the target data is determined as being the character code associated with the plurality of character forms, prefetching data stored in the buffer after the target data, as prefetched data, before printing the target data, and determining whether the prefetched data prefetched from the buffer is a predetermined code indicating one of the plurality of character forms or not; and when the prefetched data is determined as being the predetermined code, selecting a character form indicated by the predetermined code from among the plurality of character forms associated with the target data, as a target character form, and causing the printing unit to print a character represented by the target data, in the selected target character form.

DESCRIPTION OF EXEMPLARY EMBODIMENTS

Embodiment

An embodiment of the present disclosure will now be described with reference to the drawings.

In the description below, for the sake of convenience of the description, any character expressed using 1 byte is referred to as a 1-byte character. The 1-byte character is, for example, an ANK (alphabet, numeric, kana) character. The ANK character is a character including one or both of an alphabetic character and a numeral expressed using 1 byte. That is, the ANK character is an alphanumeric character. The ANK character may also be configured to include another character expressed using 1 byte such as a katakana character expressed using 1 bytes, instead of one or both of an alphabetic character and a numeral expressed using 1 byte. The ANK character may also be configured to include this another character in addition to both of an alphabetic character and a numeral expressed using 1 byte. The alphabetic character expressed using 1 byte is, for example, a halfwidth alphabetic character. The numeral expressed using 1 byte is, for example, a halfwidth numeral. The katakana character expressed using 1 byte is, for example, a halfwidth kana character.

In the description below, for the sake of convenience of the description, any character expressed using 2 bytes is referred to as a 2-byte character. The 2-byte character is, for example, a Chinese character, a traditional Chinese character, a simplified Chinese character, a Hangul character or the like. The 2-byte character may also be configured to include another character expressed using 2 bytes, instead of a part or all of a Chinese character, a traditional Chinese character, a simplified Chinese character, and a Hangul character. The 2-byte character may also be configured to include another character expressed using 2 bytes, in addition to all of a Chinese character, a traditional Chinese character, a simplified Chinese character, and a Hangul character.

In the description below, for the sake of convenience of the description, any character that need not be distinguished as a 1-byte character or a 2-byte character is referred to as a printable character. The printable character includes a multiple-character-form character and a single-character-form character. The multiple-character-form character is a character having a plurality of character forms. In other words, the multiple-character-form character is a character expressed in each of the plurality of character forms. For example, the multiple-character-form character is included in Chinese characters, traditional Chinese characters, simplified Chinese characters, Hangul characters, or the like. The single-character-form character is a character having a single character form. In other words, the single-character-form character is a character expressed in a single character form.

Here, a multiple-character-form character expressed in a standard character form is referred to as a base character. A multiple-character-form character expressed in another character form than the standard character form is referred to as a variant character. Thus, in the description below, for the sake of convenience of the description, a standard character form, of a plurality of character forms of a multiple-character-form character, is referred to as a base character form. Also, in the description below, for the sake of convenience of the description, another character form than the base character form, of a plurality of character forms of a multiple-character-form character, is referred to as a variant character form.

Configuration of Printing System

Figure 1:
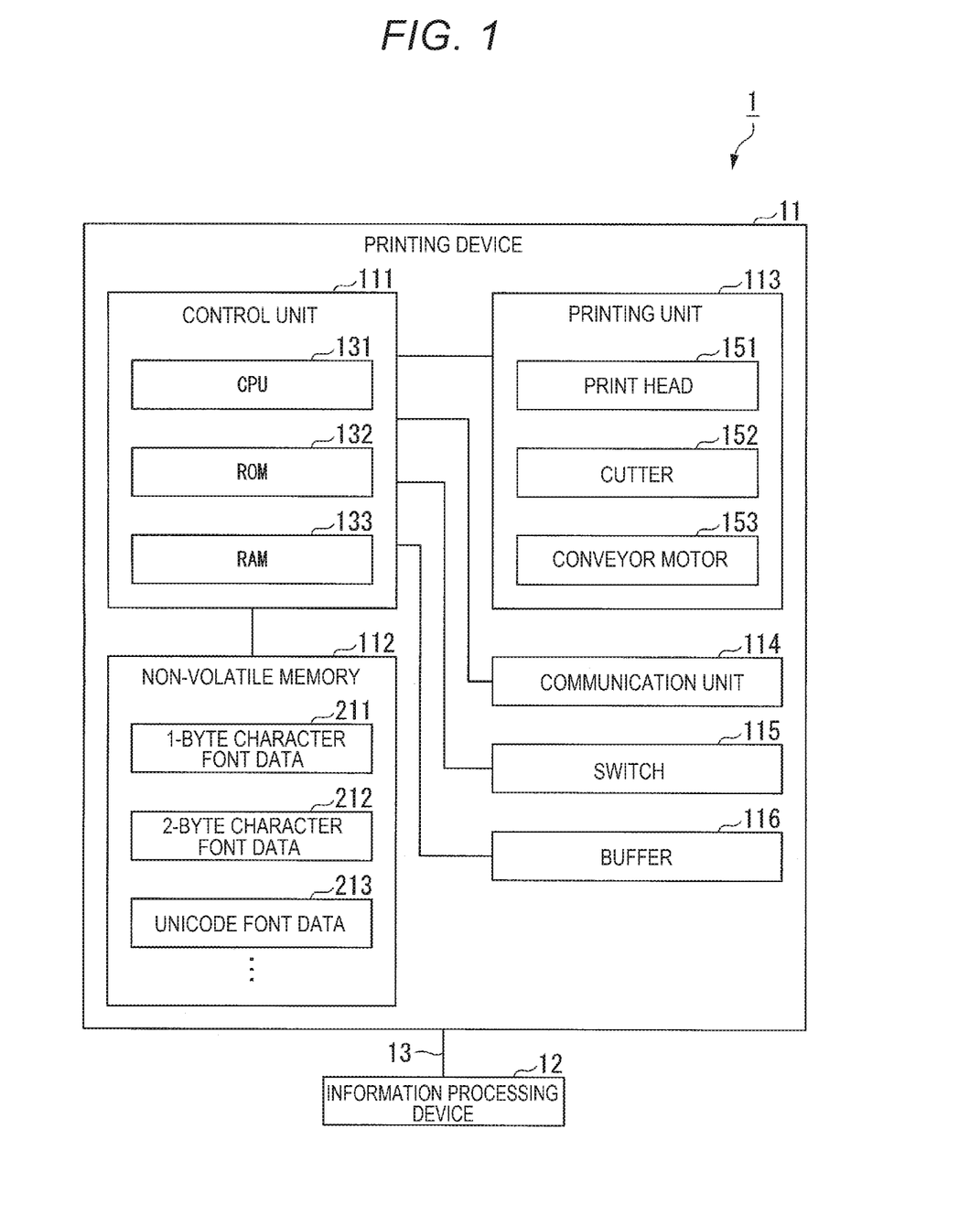
FIG. 1 shows an example of a configuration of a printing system 1 according to an embodiment.

The configuration of a printing system 1 according to the embodiment will now be described with reference to FIG. 1. FIG. 1 shows an example of the configuration of the printing system 1 according to the embodiment.

The printing system 1 has a printing device 11 and an information processing device 12.

The printing device 11 is communicatively coupled to the information processing device 12 via a wired or wireless line 13. The line 13 may be, for example, a network line. The network may be the internet.

In this embodiment, to simply the description, one printing device 11 and one information processing device 12 are illustrated. However, for example, a plurality of information processing devices 12 may be coupled to one printing device 11. Also, for example, a plurality of printing devices 11 may be coupled to one information processing device 12.

In this way, the printing system 1 may have any number of printing devices 11 and any number of information processing devices 12. The devices provided in the printing system 1 may be placed in any arrangement.

The information processing device 12 communicates with the printing device 11 and transmits an encoding scheme designation command. The encoding scheme designation command is a command designating, to the printing device 11, an encoding scheme to be used by the printing device 11 in order to specify a character indicated by a character code received by the printing device 11.

For example, when specifying a 1-byte character indicated by a 1-byte character code, the printing device 11 uses a 1-byte character encoding scheme to specify the 1-byte character indicated by the 1-byte character code. The 1-byte character encoding scheme is an encoding scheme where a 1-byte character code and a 1-byte character are associated with each other, for example, ASCII or the like. That is, a 1-byte character code configured based on the 1-byte character encoding scheme is, for example, an ASCII character code or the like. Meanwhile, for example, when specifying a 2-byte character indicated by a 2-byte character code, the printing device 11 uses a 2-byte character encoding scheme to specify the 2-byte character indicated by the 2-byte character code. The 2-byte character encoding scheme is an encoding scheme where a 2-byte character code and a 2-byte character are associated with each other. The 2-byte character encoding scheme is, for example, ISO-2022-JP, Shift_JIS, EUC-JP or the like. That is, a 2-byte character code configured based on the 2-byte character encoding scheme is, for example, an ISO-2022-JP, Shift_JIS, or EUC-JP character code, or the like. Also, for example, when specifying a character indicated by a code point, the printing device 11 uses Unicode to specify the character indicated by the code point. Unicode may also be referred to as UTF-8. Details of Unicode are defined as an International Standard and therefore will not be described here.

Figure 2:
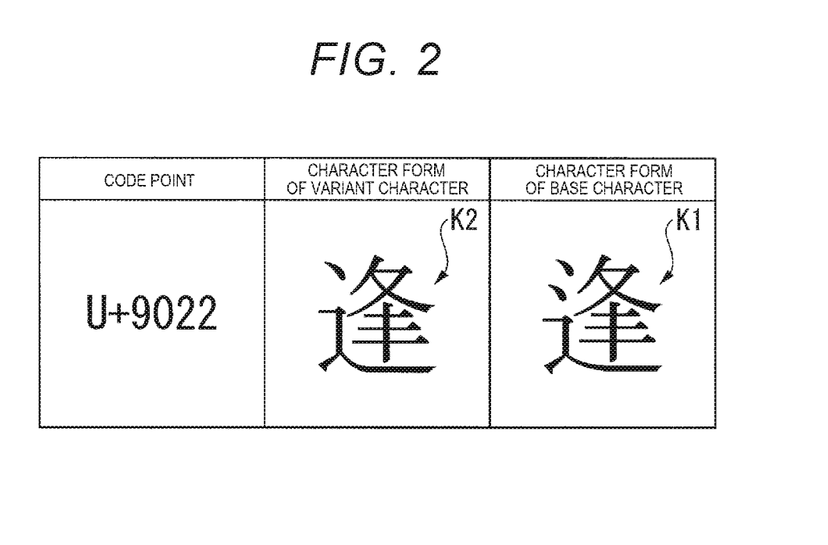
FIG. 2 shows an example of a relationship between a code point indicating a multiple-character-form character, a base character form, and a variant character form.

In Unicode, each individual single-character-form character is indicated by one code point. However, in Unicode, each individual multiple-character-form character, too, is indicated by one code point. Therefore, in Unicode, as shown in FIG. 2, a code point indicating a multiple-character-form character cannot distinguish a plurality of character forms of the multiple-character-form character. FIG. 2 shows an example of the relationship between a code point indicating a multiple-character-form character, a base character form, and a variant character form. A code point "U+9022" shown in FIG. 2 is a code point associated with a base character "逢". In FIG. 2, a base character form K1 is shown as the base character form of the base character "逢". This code point "U+9022" is also associated with a variant character of "逢" expressed in a variant character form K2. In this way, in Unicode, a code point cannot distinguish a plurality of character forms of a multiple-character-form character.

The information processing device 12 communicates with the printing device 11 and transmits a print instruction to the printing device 11.

The print instruction includes a character code indicating a printable character to be a print target. For example, an instruction to print a 1-byte character includes a 1-byte character code indicating the 1-byte character or a code point indicating the 1-byte character. Also, for example, an instruction to print a 2-byte character includes a 2-byte character code indicating the 2-byte character or a code point indicating the 2-byte character. The print instruction also includes, for example, a predetermined code designating a character form of a multiple-character-form character, of printable characters. When a character form of a multiple-character-form character is not to be designated, the print instruction may not include a predetermined code or may include a predetermined code designating a base character form. In the description below, for the sake of convenience of the description, the predetermined code is referred to as a variation selector. The print instruction may also include other information.

The information processing device 12 may be any device, for example, a personal computer, smartphone or the like.

The information processing device 12 is operated by a user, not illustrated, and executes processing corresponding to the operation carried out by the user. The information processing device 12 may also be configured to automatically execute predetermined processing.

The printing device 11 has a control unit (controller) 111, a non-volatile memory 112, a printing unit (print mechanism) 113, a communication unit 114, a switch 115, and a buffer 116.

The control unit 111 has a CPU (central processing unit, processor) 131, a ROM (read-only memory) 132, and a RAM (random-access memory) 133. The control unit 111 may also have another control circuit or the like.

The printing unit 113 has a print head 151, a cutter 152, and a conveyor motor 153.

In the non-volatile memory 112, 1-byte character font data 211, 2-byte character font data 212, and Unicode font data 213 are stored.

Here, font data is actual data representing a character in a form that is printable on a print medium, for example, bitmap font data. A 1-byte character code address table, a 2-byte character code address table, and a code point address table are stored in the ROM 132, described later. The 1-byte character code address table is a table showing the address on the non-volatile memory 112, of bitmap font data associated with each 1-byte character code. The 2-byte character code address table is a table showing the address on the non-volatile memory 112, of bitmap font data associated with each 2-byte character code. The code point address table is a table showing the address on the non-volatile memory 112, of bitmap font data associated with each code point.

That is, the 1-byte character font data 211 is bitmap font data representing a 1-byte character in a form that is printable on a print medium. Data received by the communication unit 114 is stored into the buffer 116, described later, in the order in which the data is received by the communication unit 114. The control unit 111 reads out the data from the buffer 116 in the order in which the data is received by the communication unit 114. When the read-out data is a 1-byte character code, the control unit 111 refers to the ROM 132, based on the 1-byte character code, then acquires the address on the non-volatile memory 112 of the 1-byte character code with reference to the 1-byte character code address table, and reads out target bitmap font data from the 1-byte character font data 211, based on the acquired address. The control unit 111 then arranges the read-out bitmap font data in an order in which the bitmap font data is printable with the print head 151, and stores (loads) the bitmap font data into the RAM 133 (print buffer). When the control unit 111 has already received a character decoration command, the control unit 111 performs processing designated by the character decoration command, on the read-out bitmap font data, and stores the processed bitmap font data into the RAM 133. The control unit 111 then reads out the bitmap font data stored in the RAM 133 and sends the bitmap font data to the printing unit 113 to perform printing.

The 2-byte character font data 212 is bitmap font data representing a 2-byte character in a form that is printable on a print medium. When the read-out data is a 2-byte character code, the control unit 111 refers to the ROM 132, based on the 2-byte character code, then acquires the address on the non-volatile memory 112 of the 2-byte character code with reference to the 2-byte character code address table, and reads out target bitmap font data from the 2-byte character font data 212, based on the acquired address. The control unit 111 then arranges the read-out bitmap font data in an order in which the bitmap font data is printable with the print head 151, and stores (loads) the bitmap font data into the RAM 133 (print buffer). When the control unit 111 has already received a character decoration command, the control unit 111 performs processing designated by the character decoration command, on the read-out bitmap font data, and stores the processed bitmap font data into the RAM 133. The control unit 111 then reads out the bitmap font data stored in the RAM 133 and sends the bitmap font data to the printing unit 113 to perform printing.

The Unicode font data 213 is bitmap font data representing a character indicated by a code point in a form that is printable on a print medium. When the read-out data is a code point, the control unit 111 refers to the ROM 132, based on the code point, then acquires the address on the non-volatile memory 112 of the code point with reference to the code point address table, and reads out target bitmap font data from the Unicode font data 213, based on the acquired address. The control unit 111 then arranges the read-out bitmap font data in an order in which the bitmap font data is printable with the print head 151, and stores (loads) the bitmap font data into the RAM 133 (print buffer). When the control unit 111 has already received a character decoration command, the control unit 111 performs processing designated by the character decoration command, on the read-out bitmap font data, and stores the processed bitmap font data into the RAM 133. The control unit 111 then reads out the bitmap font data stored in the RAM 133 and sends the bitmap font data to the printing unit 113 to perform printing.

In this embodiment, the three types of font data stored in the non-volatile memory 112 are stored into the non-volatile memory 112 before the shipping of the printing device 11. Also, new font data may be stored into the non-volatile memory 112, for example, after the shipping of the printing device 11. The font data stored in the non-volatile memory 112 may be, for example, rewritten or deleted or the like after the shipping of the printing device 11.

When the Unicode font data 213 can be included in the 1-byte character font data 211 and the 2-byte character font data 212, the non-volatile memory 112 may be configured not to store the Unicode font data 213. In this case, for example, the ROM 132 has a table for converting each code point into a corresponding character code. When the control unit 111 has received a code point, the control unit 111 refers to this table, converts the code point into the character code corresponding to the code point, acquires the address on the non-volatile memory 112 of the character code, and reads out target bitmap font data from the 1-byte character font data 211 or the 2-byte character font data 212, based on the acquired address.

The control unit 111 controls each part of the printing device 11.

The ROM 132 stores a control program executed by the CPU 131 and various data in a non-volatile manner.

The RAM 133 functions as a work area for the CPU 131 and temporarily stores various data.

The CPU 131 reads out and executes the control program or the like stored in the ROM 132 and thus controls each part of the printing device 11.

The non-volatile memory 112 has, for example, a storage medium such as a semiconductor memory element like an EEPROM (electrically erasable programmable read-only memory) or flash memory, a hard disk, or the like, and stores various data in a rewritable and non-volatile manner.

Generally, a non-volatile memory retains data stored therein even when power is not supplied. Generally, a volatile memory does not retain data stored therein when power is not supplied.

The printing unit 113 prints on a print medium via a printing mechanism. The print medium is, for example, paper or the like.

In this embodiment, the printing unit 113 prints a character, using character font data.

In this embodiment, a case where the printing device 11 is a thermal printer having a thermal head and is a receipt printer printing a receipt is described. The printing device 11 may be a device of another type.

The print head 151 is a line thermal head in which a plurality of heat generation elements corresponding to resolution are arranged in a line along a direction intersecting the direction of conveyance of rolled paper. The print head 151 causes the heat generation elements to generate heat and thus forms dots on rolled paper that is thermal paper.

The cutter 152 has a fixed blade and a moving blade. The cutter 152 moves the moving blade relatively to the fixed blade so as to cross the fixed blade and the moving blade, and thus cuts rolled paper. The moving blade may be referred to as a first blade. The fixed blade may be referred to as a second blade.

The conveyor motor 153 rotates a conveyor roller, not illustrated, and thus conveys rolled paper accommodated in the casing of the printing device 11.

The printing unit 113 under the control of the control unit 111 prints a character or the like corresponding to a receipt onto rolled paper by the print head 151 while conveying the rolled paper by the conveyor motor 153, then cuts the rolled paper at a predetermined position by the cutter 152 and thus issues the receipt.

In the printing device 11, the control unit 111 stores data of a character code indicating a print target character into the RAM 133, subsequently stores the data into a predetermined print buffer, not illustrated, then sends the data to the print head 151, and thus performs print processing. However, in this embodiment, detailed description of this process is omitted.

The communication unit 114 under the control of the control unit 111 communicates with, for example, an external device such as a host computer controlling the print operation of the printing device 11, according to a predetermined communication standard. In this embodiment, the external device is the information processing device 12. That is, in this embodiment, the communication unit 114 communicates with the information processing device 12 via the line 13.

The switch 115 is, for example, a DIP switch. The switch 115 is operated by a user, not illustrated, and is switched between two or more states. In this embodiment, the switch 115 has a state of designating a predetermined encoding scheme, as a state into which the switch 115 is switched.

In a specific example, the DIP switch is set into an on-state or an off-state by the user. When the power of the printing device 11 is turned on, or when the printing device 11 is reset, the control unit 111 reads the state of the DIP switch and configures settings corresponding to this state. For example, the on-state of the DIP switch is a state of designating a predetermined encoding scheme. The off-state of the DIP switch is a state of not designating a predetermined encoding scheme.

The buffer 116 temporarily stores data accepted by the printing device 11 from the external device via the communication unit 114. More specifically, the buffer 116 under the control of the control unit 111 stores the data in order in a storage area indicated by a write pointer designated by the control unit 111. In other words, the control unit 111 causes the data to be stored in order in a storage area designated by the control unit 111 with a write pointer in the storage area of the buffer 116. Also, in the buffer 116 under the control of the control unit 111, data stored in a storage area indicated by a read pointer designated by the control unit 111 is read out from this storage area. In other words, the control unit 111 reads out data stored in a storage area designated by the control unit 111 with a read pointer in the storage area of the buffer 116, from this storage area. The buffer 116 may be included in the RAM 133 or may be integrated with the RAM 133.

In this embodiment, for the sake of convenience of the description, it is assumed that the user of the information processing device 12 is the same as the user of the printing device 11. However, these users may be different.

Figure 3:
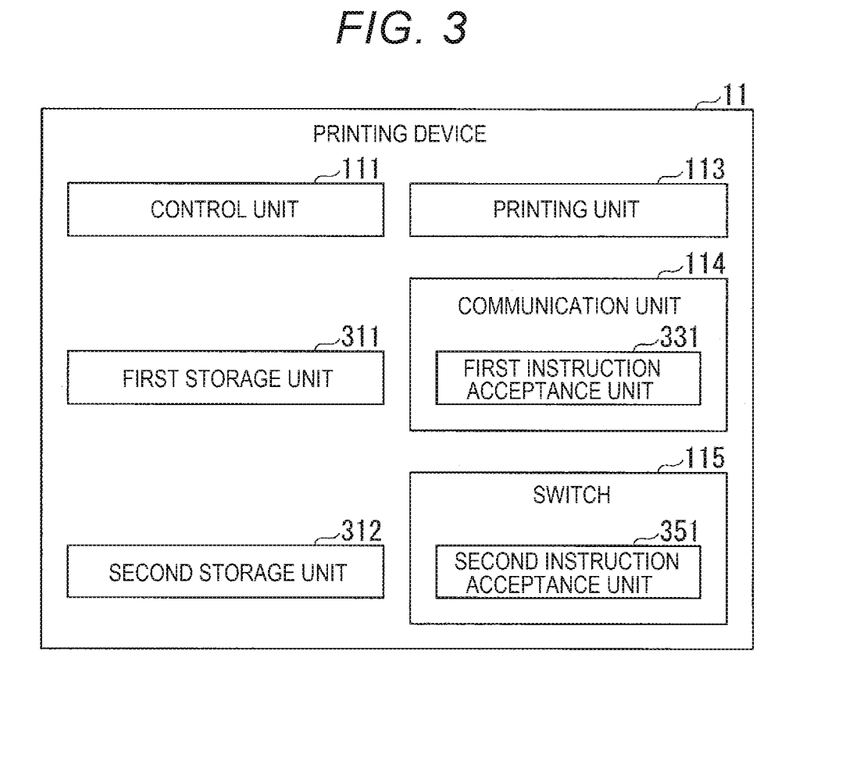
FIG. 3 shows an example of a functional configuration of a printing device 11 according the embodiment.

FIG. 3 shows an example of the functional configuration of the printing device 11 according to the embodiment.

The printing device 11 has the control unit 111, a first storage unit 311, a second storage unit 312, the printing unit 113, the communication unit 114, and the switch 115. In this embodiment, the first storage unit 311 is the non-volatile memory 112. In this embodiment, the second storage unit 312 is the RAM 133, which is a volatile memory.

The communication unit 114 has a first instruction acceptance unit 331.

The first instruction acceptance unit 331 accepts an instruction designating an encoding scheme, in terms of software. Specifically, in response to an encoding scheme designation command included in a signal received by the communication unit 114 from the external device, the first instruction acceptance unit 331 accepts an instruction designating the encoding scheme specified by the encoding scheme designation command. The encoding scheme designation command is a command in terms of software.

The first instruction acceptance unit 331 also accepts the foregoing print instruction in terms of software.

The first instruction acceptance unit 331 outputs the content of the accepted instruction to the control unit 111. The control unit 111 acquires the content of the instruction outputted from the first instruction acceptance unit 331. The functions of the first instruction acceptance unit 331 may be provided, for example, in the control unit 111.

The switch 115 has a second instruction acceptance unit 351.

The second instruction acceptance unit 351 accepts an instruction designating an encoding scheme, in terms of hardware. Specifically, according to the state into which the switch 115 is switched, the second instruction acceptance unit 351 accepts an instruction designating the encoding scheme specified by this state.

In this embodiment, the switch 115 outputs an encoding scheme designation command corresponding to the state into which the switch 115 is switched. In response to this encoding scheme designation command, the second instruction acceptance unit 351 accepts an instruction designating the encoding scheme designated by the encoding scheme designation command.

The second instruction acceptance unit 351 outputs the content of the accepted instruction to the control unit 111. The control unit 111 acquires the content of the instruction outputted from the second instruction acceptance unit 351. The functions of the second instruction acceptance unit 351 may be provided, for example, in the control unit 111.

In this embodiment, for the sake of convenience of the description, a case where both the first instruction acceptance unit 331 and the second instruction acceptance unit 351 are provided in the printing device 11 is described. However, as another configuration example, a configuration where only one of the first instruction acceptance unit 331 and the second instruction acceptance unit 351 is provided in the printing device 11 may be used.

The control unit 111 selects an encoding scheme used by the printing device 11, based on an instruction designating an encoding scheme accepted by the first instruction acceptance unit 331. That is, the control unit 111 can select the encoding scheme designated by the instruction, as the encoding scheme used for printing. In the description below, for the sake of convenience of the description, the encoding scheme selected by the control unit 111 is referred to as a selected encoding scheme. For example, when the encoding scheme selected by the control unit 111 is the 1-byte character encoding scheme, the selected encoding scheme is the 1-byte character encoding scheme. Also, for example, when the encoding scheme selected by the control unit 111 is the 2-byte character encoding scheme, the selected encoding scheme is the 2-byte character encoding scheme. Meanwhile, for example, when the encoding scheme selected by the control unit 111 is Unicode, the selected encoding scheme is Unicode.

The control unit 111 also designates a write pointer for the buffer 116, based on a predetermined writing rule, and temporarily stores data accepted by the printing device 11 from the external device into the storage area indicated by the write pointer in the storage area of the buffer 116. The writing rule is, for example, that a write pointer should be designated in such a way that data is stored in the buffer 116 in the order of acceptance. The writing rule may be another rule. The control unit 111 also designates a read pointer for the buffer 116, based on a predetermined reading rule, and reads out data stored in the storage area indicated by the read pointer in the storage area of the buffer 116, from this storage area. The reading rule is, for example, that a read pointer should be designated in such a way that data is read out from the buffer 116 in the order of acceptance. The reading rule may be another rule. The control unit 111 also performs prefetching in which, while holding the current read pointer, the control unit 111 refers to a storage area where data accepted by the printing device 11 after the data stored in the storage area indicated by this read pointer is stored. Thus, the control unit 111 can refer to the data accepted by the printing device 11 after the data stored in the storage area indicated by the read pointer, without reading out the data from this storage area.

When Unicode is selected as the selected encoding scheme and the control unit 111 has accepted a print instruction, the control unit 111 performs the following processing. That is, the control unit 111 causes the buffer 116 to store data of the accepted print instruction. The control unit 111 reads out the data stored in the buffer 116, as target data from the buffer 116. The control unit 111 determines which of a command and a character code the read-out target data is. When the target data is determined as being a character code, the control unit 111 determines whether the target data is a character code associated with a plurality of character forms or not. Here, the character code associated with a plurality of character forms is a character code indicating a multiple-character-form character. When the target data is determined as being a character code associated with a plurality of character forms, the control unit 111 prefetches data stored in the buffer 116 after the target data, as prefetched data, before printing the target data. The control unit 111 determines whether the prefetched data prefetched from the buffer 116 is a variation selector indicating one of the plurality of character forms or not. When the prefetched data is determined as being a variation selector, the control unit 111 selects, as a target character form, the character form indicated by the variation selector from among the plurality of character forms associated with the target data. The control unit 111 then causes the printing unit 113 to print the character represented by the target data, in the selected target character form. Thus, the printing device 11 can easily print a multiple-character-form character in a desired character form. The character code associated with a plurality of character forms may be described as a specific character code that is printable in a desired character form from among the plurality of character forms.

Figure 4:
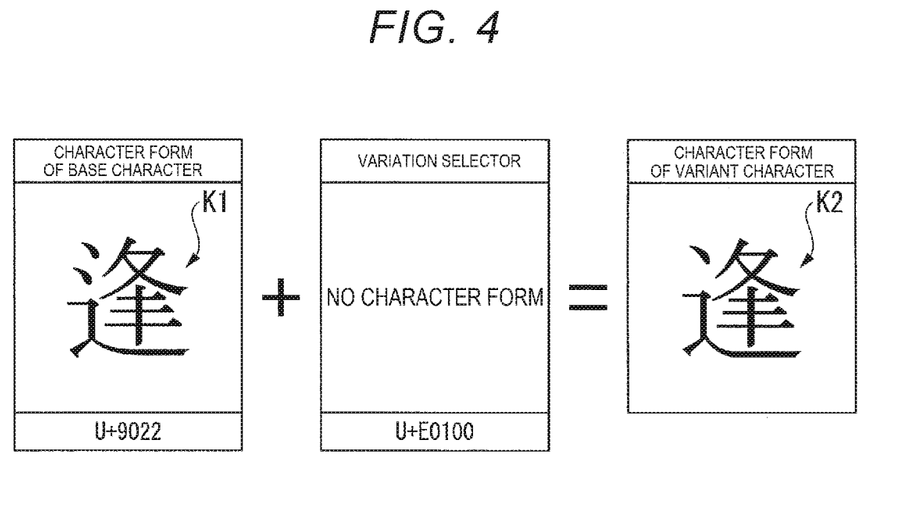
FIG. 4 shows an outline of representation of a variant character form based on a combination of a code point and a variation selector.

FIG. 4 shows an outline of representation of a variant character form based on a combination of a code point and a variation selector. As shown in FIG. 4, when the printing device 11 has accepted a variation selector "U+E0100" along with the code point "U+9022" indicating the base character "逢" in the base character form K1, the printing device 11 prints the Chinese character indicated by the code point "U+9022" in a variant character form K2. That is, the printing device 11 can easily print a multiple-character-form character in a desired character form.

As described above, the multiple-character-form character includes, for example, at least a part of a Chinese character, a traditional Chinese character, a simplified Chinese character, a Hangul character or the like. That is, the character code indicating the multiple-character-form character includes at least a part of a character code indicating a Chinese character, a character code indicating a traditional Chinese character, a character code indicating a simplified Chinese character, a character code indicating a Hangul character or the like.

Processing carried out by such a control unit 111 on accepting a print instruction will be described in detail below.

Processing Carried Out By Control Unit on Accepting Print Instruction

Figure 5:
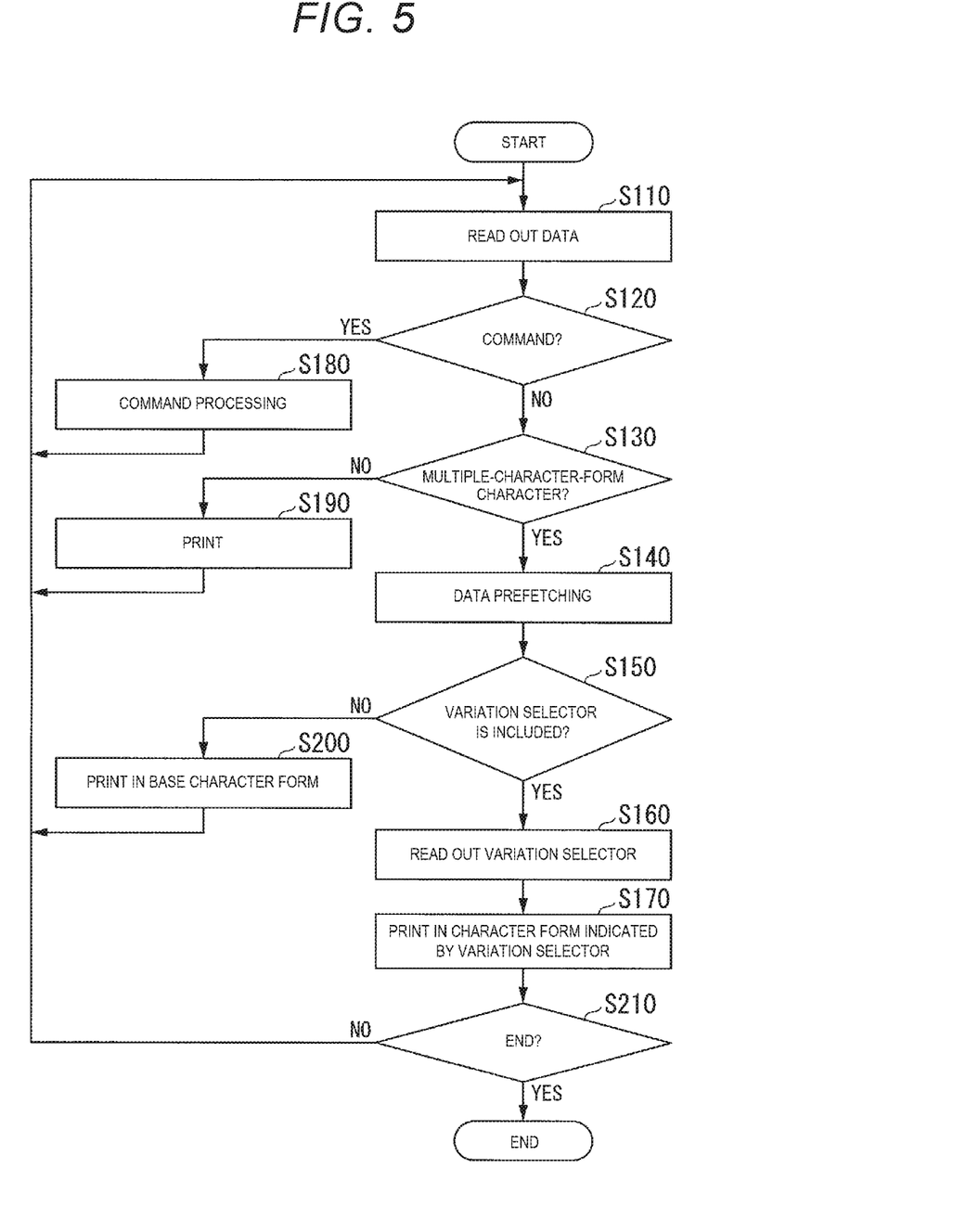
FIG. 5 shows an example of a flow of processing carried out when a control unit 111 accepts a print instruction.

The processing carried out by the control unit 111 on accepting a print instruction will now be described with reference to FIG. 5. FIG. 5 shows an example of the flow of the processing carried out by the control unit 111 on accepting a print instruction. In the description below, an example case where the printing device 11 accepts a print instruction for a character string including a character code indicating each of one or more print target characters from the information processing device 12 at a timing before the processing in step S110 shown in FIG. 5 is carried out, is described. In this case, the control unit 111 causes the buffer 116 to store data of the accepted print instruction, taking each of a command and a character code included in the data as a unit, and one by one in the order of acceptance. That is, processing shown in the flowchart of FIG. 5 is processing executed by the control unit 111 after the data is stored in the buffer 116. Here, the character string may include a 1-byte character, may include a 2-byte character, or may include both a 1-byte character and a 2-byte character. In the description below, a case where the selected encoding scheme is Unicode is described.

The control unit 111 designates a read pointer and reads out data from the buffer 116 as target data (step S110).

Next, the control unit 111 determines which of a command and a code point the target data read out in step S110 is (step S120).

When the control unit 111 has determined that the target data is a command (YES in step S120), the control unit 111 performs processing corresponding to the target data, which is a command (step S180). In FIG. 5, the processing in step S180 is described as "command processing" in order to avoid making the illustration complicated. After performing the processing in step S180, the control unit 111 shifts to step S110, designates a next read pointer, and reads out next target data from the buffer 116.

Meanwhile, when the control unit 111 has determined that the target data is not a command (NO in step S120), the control unit 111 determines that the target data is a code point, and determines whether the target data, which is a code point, represents a multiple-character-form character or not (step S130).

When the control unit 111 has determined that the target data, which is a code point, represents a single-character-form character (NO in step S130), the control unit 111 prints the single-character-form character represented by the target data (step S190). After performing the processing in step S190, the control unit 111 shifts to step S110, designates a next read pointer, and reads out next target data from the buffer 116.

Meanwhile, when the control unit 111 has determined that the target data, which is a code point, represents a multiple-character-form character (YES in step S130), the control unit 111 prefetches data from the buffer 116 and refers to data accepted by the printing device 11 after the target data, as prefetched data (step S140). In step S140, the control unit 111 prefetches data from the buffer 116 until a next code point is found within a range from a storage area where data following the target data is stored to a storage area where the next code point is stored or to a point preceding a write pointer. In other words, the control unit 111 sequentially refers to data in the buffer 116 as prefetched data while shifting the read pointer forward one by one, until the next code point is found within the range from the storage area where the data following the target data is stored to the point preceding the write pointer. After prefetching the prefetched data, the control unit 111 returns the read pointer to the storage area before the prefetching, that is, to the storage area where the data following the target data is stored, and thus can process the data in the order of reception. In FIG. 5, the processing in step S140 is described as "data prefetching" in order to avoid making the illustration complicated.

Next, the control unit 111 determines whether the prefetched data prefetched in step S140 includes a variation selector or not (step S150). Specifically, the control unit 111 determines whether one or more prefetched data referred to in step S140 includes a variation selector or not.

When the control unit 111 has determined that the prefetched data prefetched in step S140 includes no variation selector (NO in step S150), the control unit 111 prints the multiple-character-form character represented by the target data, which is a code point, in the base character form (step S200). After performing the processing in step S200, the control unit 111 shifts to step S110, designates a next read pointer (storage area before prefetching), and reads out next target data from the buffer 116.

Meanwhile, when the control unit 111 has determined that the prefetched data prefetched in step S140 includes a variation selector (YES in step S150), the control unit 111 reads out the variation selector from the buffer 116 (step S160). The control unit 111 then prints the multiple-character-form character represented by the target data, which is a code point, in the character form indicated by the read-out variation selector (step S170). The next time the variation selector read out in step S160 is read out from the buffer 116 in the order of reception, control unit 111 reads and throws away or ignores the variation selector and performs no processing on the variation selector.

The control unit 111 is configured in such a way that, when the variation selector is received mostly or always immediately after the multiple-character-form character, the control unit 111, for the "data prefetching", reads out data from the buffer 116 while shifting the read pointer forward only to the storage area where the data following the target data is stored as in the usual processing in the order of reception, and then determines whether a variation selector is included or not, and performs processing.

After performing the processing in step S170, the control unit 111 determines whether to end the processing or not (step S210). For example, when all the data designated by the print instruction have been read out from the buffer 116, the control unit 111 determines in step S210 that the processing is to end. Meanwhile, for example, when all the data designated by the print instruction have not been read out from the buffer 116, the control unit 111 determines in step S210 that the processing is not to end. The control unit 111 may be configured to determine whether to end the processing or not, by another method in step S210.

When the control unit 111 has determined that the processing is not to end (NO in step S210), the control unit 111 shifts to step S110, designates a next read pointer, and reads out next target data from the buffer 116.

Meanwhile, when the control unit 111 has determined that the processing is to end (YES in step S210), the control unit 111 ends the processing.

The control unit 111 may perform the processing in the flowchart shown in FIG. 5 when the selected encoding scheme is another encoding scheme than Unicode. However, in this case, the encoding scheme is an encoding scheme in which a multiple-character-form character is indicated by one character code, of other encoding schemes than Unicode.

As described above, a printing device according to an embodiment has: a printing unit performing printing; a buffer temporarily storing accepted data; and a control unit causing the printing unit to print, based on data stored in the buffer. The control unit reads out data from the buffer as target data and determines which of a command and a character code the read-out target data is. When the target data is determined as being the character code, the control unit determines whether the target data is the character code associated with a plurality of character forms or not. When the target data is determined as being the character code associated with the plurality of character forms, the control unit prefetches data stored in the buffer after the target data, as prefetched data, before printing the target data, and determines whether the prefetched data prefetched from the buffer is a predetermined code indicating one of the plurality of character forms or not. When the prefetched data is determined as being the predetermined code, the control unit selects a character form indicated by the predetermined code from among the plurality of character forms associated with the target data, as a target character form, and causes the printing unit to print a character represented by the target data, in the selected target character form. Thus, the printing device can easily print a character having a plurality of character forms, in a desired character form. In the foregoing example, the printing device 11 is an example of the printing device. In the foregoing example, the printing unit 113 is an example of the printing unit. In the foregoing example, the buffer 116 is an example of the buffer. In the foregoing example, the control unit 111 is an example of the control unit. In the foregoing example, the code point is an example of the character code. In the foregoing example, the data referred to in step S140 is an example of the prefetched data. In the foregoing example, the variation selector is an example of the predetermined code.

In the printing device, when a second encoding scheme that is different from a first encoding scheme is selected, when accepting a first-type character decoration command and printing a character string including both a character of a first type and a character of a second type, the control unit may cause the printing unit to print the character string in which character decoration designated by the first-type character decoration command is performed on the character of the first type and the character decoration designated by the first-type character decoration command is not performed on the character of the second type. Thus, the printing device can selectively decorate and print a 1-byte character of characters indicated by code points.

In the printing device, an encoding scheme for the character code may be Unicode.

In the printing device, the character code associated with the plurality of character forms may include at least a part of a character code indicating a Chinese character, a character code indicating a traditional Chinese character, a character code indicating a simplified Chinese character, and a character code indicating a Hangul character.

An embodiment of the present disclosure has been described in detail with reference to the drawings. However, the present disclosure is not limited to the specific configurations in the embodiment. Change, replacement, deletion or the like can be made without departing from the spirit and scope of the present disclosure.

A program to implement a function of any component of the above device may be recorded in a computer-readable recording medium, and a computer system may read and execute the program. The device in this case is, for example, the printing device 11, the information processing device 12 or the like. The "computer system" in this case includes an OS (operating system) and hardware such as a peripheral device. The "computer-readable recording medium" refers to a portable medium such as a flexible disk, magneto-optical disk, ROM, or CD-ROM (compact disk ROM), or a storage device such as a hard disk built in the computer system. The "computer-readable recording medium" also includes a medium holding the program for a predetermined time, such as a volatile memory in a computer system that serves as a server or client when the program is transmitted via a network such as the internet or via a communication line such as a telephone line.

The program may be transmitted from a computer system storing this program in a storage device or the like to another computer system via a transmission medium or via a transmission wave in a transmission medium. The "transmission medium" transmitting the program in this case refers to a medium having the function of transmitting information, like a network such as the internet or like a communication line such as a telephone line.

The program may also be configured to implement a part of the foregoing functions. The program may also be a program that can implement the foregoing functions when combined with a program already recorded in the computer system, that is, a so-called difference file or difference program.

What is claimed is:

1. A printing device comprising:

a print mechanism performing printing;

a buffer temporarily storing accepted data; and a controller causing the print mechanism to print based on data stored in the buffer, wherein the controller is configured to:

reads out data from the buffer as target data and determines that the read-out target data is which of a command and a character code, when determining that the target data is the character code, determining whether the target data is the character code associated with a plurality of character forms or not, when determining that the target data is the character code associated with the plurality of character forms, prefetches data stored in the buffer after the target data as prefetched data before printing the target data, and determines whether the prefetched data prefetched from the buffer is a predetermined code indicating one of the plurality of character forms or not, and when determining that the prefetched data is the predetermined code, selects a character form indicated by the predetermined code from among the plurality of character forms associated with the target data as a target character form, and causes the print mechanism to print a character represented by the target data in the selected target character form.

2. The printing device according to claim 1, wherein an encoding scheme for the character code is Unicode.

3. The printing device according to claim 1, wherein the character code associated with the plurality of character forms includes at least a part of a character code indicating a Chinese character, a character code indicating a traditional Chinese character, a character code indicating a simplified Chinese character, and a character code indicating a Hangul character.

4. A control method for a printing device, the method comprising:

causing a print mechanism performing printing based on data stored in a buffer temporarily storing accepted data;

reading out data from the buffer as target data and determining that the read-out target data is which of a command and a character code;

when determining that the target data is the character code, determining whether the target data is the character code associated with a plurality of character forms or not;

when determining that the target data is the character code associated with the plurality of character forms, prefetching data stored in the buffer after the target data as prefetched data before printing the target data, and determining whether the prefetched data prefetched from the buffer is a predetermined code indicating one of the plurality of character forms or not; and when determining that the prefetched data is the predetermined code, selecting a character form indicated by the predetermined code from among the plurality of character forms associated with the target data as a target character form, and causing the print mechanism to print a character represented by the target data in the selected target character form.

5. A printing device comprising:
a print mechanism performing printing;
a buffer storing data; and
a controller causing the print mechanism to print based on the data, wherein
the controller is configured to execute following steps:
when reading out a character code from the buffer as target data, determining whether the character code is a specific character code that is printable in a predetermined character form of a plurality of character forms,
when determining that the character code is the specific character code, determining, based on data stored in the buffer after the target data, which character form to print the specific character code from the plurality of character forms,
causing the print mechanism to print the specific character code in the determined character form, and
when determining that the character code is not the specific character code, causing the print mechanism to print the character code without a determination based on the data stored in the buffer after the target data.

* * * * *